May 13, 1958 J. E. FEUCHT 2,834,577
ROCK DRILL FRONT END WITH DUST COLLECTING DEVICE
Filed March 23, 1955
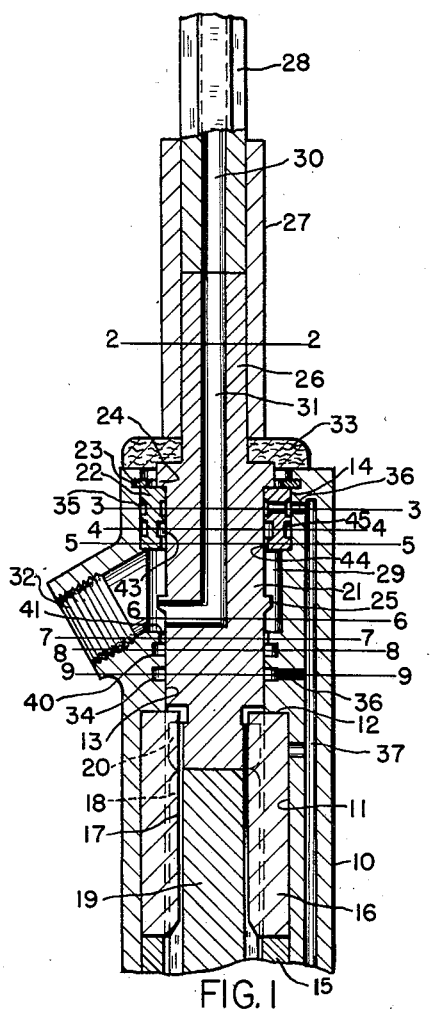
FIG. 1
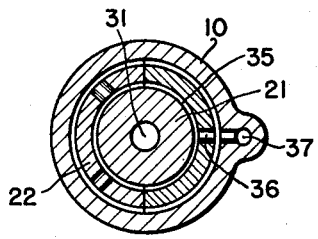
FIG. 3
FIG. 4
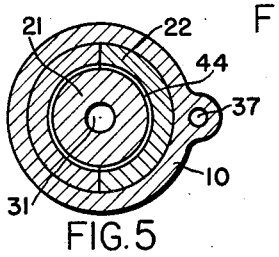
FIG. 5
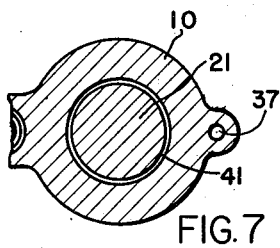
FIG. 7
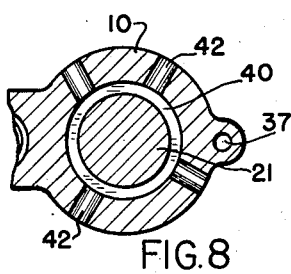
FIG. 8
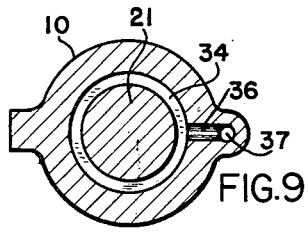
FIG. 2
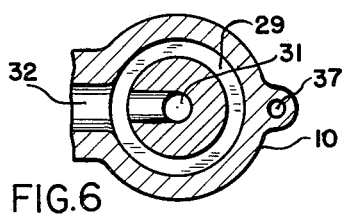
FIG. 9
FIG. 6
*INVENTOR.*
JACOB E. FEUCHT
BY
ATTORNEY

United States Patent Office 2,834,577
Patented May 13, 1958

2,834,577

ROCK DRILL FRONT END WITH DUST COLLECTING DEVICE

Jacob E. Feucht, Garfield Heights, Ohio, assignor to Cleveland Rock Drill Division, Westinghouse Air Brake Company, Pittsburgh, Pa., a corporation of Pennsylvania Application March 23, 1955, Serial No. 496,181

7 Claims. (Cl. 255—50)

This invention relates broadly to rock drills, but more particularly to an improved rock drill front end equipped with a dust collecting device.

Rock drill front ends designed for connection with dust collecting devices of the suction type, are generally provided with a relatively large dust collecting chamber wherein the dust, resulting from the drilling operation, is admitted through the drill steel hole. From that chamber, dust is sucked through a flexible conduit into the dust collector. For the sake of compactness, simplicity and cheapness, it is expedient to locate that dust chamber within the upper end of the front or chuck housing, in surrounding relationship with the drill steel chuck and intermediate the bearings thereof. As a result, the dust from such chamber working down on the bearing surfaces of the drill steel chuck would become impregnated with lubricant supplied to the bearings to form a lapping compound causing excessive wear of the bearings.

It is therefore an object of this invention to provide a rock drill front housing of the dust collecting type with simple and positive means to maintain the drill steel chuck bearings free of drilling dust.

Another object of this invention is to produce an improved rock drill front housing, formed with a dust collecting chamber, with dust barrier grooves preventing dust to seep from the chamber to the front and rear bearings of the drill steel chuck.

Another object of this invention is to provide such a front housing with simple and efficient lubricating means for the drill steel chuck bearings, without danger of the lubricant becoming mixed with drilling dust to form a lapping compound causing excessive wear of the bearings.

Other objects and advantages more or less ancillary to the foregoing reside in the specific construction and aggroupment of the elements peculiar to this structure, as will become apparent from a more complete examination of this specification.

In the accompanying drawings,

Fig. 1 is a longitudinal sectional view of a rock drill front end embodying the invention.

Figs. 2 to 9 inclusive, are cross sectional views taken on lines 2—2 to 9—9 respectively in Fig. 1.

Referring to the drawings, 10 designates a rock drill front housing having a bore 11 centrally therethrough defining an annular shoulder 12, a cylindrical surface bearing 13 and a counterbore 14 leading through the upper end of the housing. In the bore 11, between shoulder 12 and a spacer 15, is rotatably mounted the usual chuck sleeve 16 having its inner wall formed with splines 17 in mesh with the corresponding splines 18 of a piston stem 19, and also in mesh with the splines 20 formed on the inner end of a drill steel chuck member 21. Adjacent its splines 20, member 21 has an inner end portion rotatably and slidably guided within the bearing portion 13 of bore 11, and also has an outer end portion similarly guided within a two piece bushing 22 closely fitted within the counterbore 14 and retained therein by a split spring ring 23 grooved into the free end of counterbore 14. Endwise movement of the chuck member 21 is limited by annular shoulders 24 and 25 engageable with opposite ends of bushing 22, the shoulders being spaced sufficiently to enable slidable movement of the chuck member relative to housing 10. In the present embodiment of the invention, chuck member 21 instead of being provided with the usual polygonal socket adapted to receive the correspondingly shaped shank of the drill steel, is provided with an integral polygonal stem 26 extending therefrom through the open end of housing 10, and having slidable thereon a coupler in the form of a sleeve 27 of polygonal internal shape, which sleeve extends beyond stem 26 to form a socket adapted to receive the shank of a drill steel 28.

Between its two bearings 13 and 22, chuck member 21 is surrounded by a relatively large suction chamber 29, which is in constant communication with the usual drill steel hole 30 through passage 31 formed within chuck member 21. From chamber 29 leads a bore defining a relatively large dust conveying passage 32, which is internally threaded to connect with one end of a flexible conduit, not shown, while its other end is connected to the vacuum side of a dust collector. A rubber shield 33 is closely fitted on the inner end of the chuck stem 26 and made to normally rest on the front end of housing 10 to prevent admission of drilling dust into the housing.

Referring now more particularly to the invention, it will be understood that the inner wall of bushing 22 together with the cylindrical wall portion 13 of bore 11, constitute two longitudinally spaced bearings for the chuck member 21. As usual in such constructions, the walls of bearings 13 and 22 are provided with lubricant supplying annular grooves 34 and 35 respectively which are connected through radial ports 36 with a passage 37 formed within the wall of housing 10. This passage, which is generally controlled by the throttle valve controlling the operation of the rock drill, is adapted to convey oil laden compressed air to the grooves 34 and 35 to keep the two bearings 13 and 22 lubricated. Normally this type of lubricating system is fairly satisfactory, but when the rock drill is equipped with a dust collecting device including the dust chamber 29, it has been found that the drilling dust from the bit end of the drill steel, sucked into the chamber 29 through the drill steel hole 30 and chuck port 31, would tend to seep or work its way on the bearing surfaces and mix with the oil to form a lapping compound seriously affecting the wear and life of the bearings. To eliminate this deleterious condition, bearing 13 is provided with a second annular groove 40 located between lubricant groove 34 and chamber 29 and in constant communication with the chamber through a slight or restricted annular clearance defining an annular passageway 41 between the bearing surface 13 and chamber 29. Groove 40 is in communication with the outside of chuck housing 10 through a plurality of radial ports 42. Similarly, bushing 22 is provided with an additional internal annular groove 43 located between the bearing surface of the bushing and chamber 29 and in constant communication with the chamber through a slight clearance defining a restricted annular passageway 44 between groove 43 and chamber 29. Groove 43 is connected to an external annular groove 45 through radial ports 46, while the groove 45 is connected with the outside of chuck housing 10 through radial ports 47.

The operation of the device is as follows: As the rock drill is actuated in the usual manner to effect the reciprocatory motion of the piston and its stem 19, impacts in rapid succession are delivered on the inner end of the chuck member 21 by the piston stem 19, and rotation from the piston stem is also transmitted to the chuck member through the chuck sleeve 16. From chuck member 21 impacts and rotation are transmitted to the drill steel 28 to drill a hole in the rock in the usual and well known manner. Concurrently oil laden compressed air is admitted into the lubricant grooves 34 and 35 of the bearings 13 and 22 through chuck housing passage 37 and radial ports 36. On both sides of each lubricant grooves 34 and 35, the bearing surfaces are closely fitted over the chuck member 21 with practically no clearance therebetween, thereby resulting in a pair of longitudinally spaced accurate and well lubricated bearings for the chuck member 21.

As the dust collecting device is turned on, a vacuum or suction is created in the dust chamber 29 through the conduit, not shown, connected to the dust passage 32, thereby sucking air, dust and cuttings into the chamber 29 through the drill steel hole 30 and chuck passage 31, and from the chamber into the dust collector. The suction created in chamber 29 also causes atmospheric or free air to be sucked into the annular groove 40 of bearing 13 through radial ports 42, and from groove 40 into the chamber via the annular passageway 41. Similarly free air is sucked into annular groove 43 of bearing 22 through radial ports 47, external groove 45 and radial ports 46, and from groove 43 into chamber 29 through the annular passageway 44. The width of the two annular passageways 41 and 44 is relatively small, their diameters being about ten to twelve thousandths of an inch greater than the corresponding diameter of the chuck member 21, thereby causing the free air to be drawn into chamber 29 at relatively high velocity to form dust barriers entirely around the chuck member and adjacent both ends of the chamber 29. The annular streams of high velocity air drawn over the entire peripheral wall of the chuck member 21 into the opposite ends of the chamber 29, also carries with it a small amount of lubricant escaped from the annular grooves 34 and 35. However, that small amount of lubricant carried into chamber 29 by swiftly flowing air, is immediately carried thereby into the dust collector.

From the foregoing description, it will be understood that the invention provides two very simple and efficient dust barriers one adjacent each end of the dust chamber 29, through which the longitudinally spaced bearings 13 and 22 of the chuck member 21 are kept clean and free of any dust and oil compound affecting the wear and life of the bearings. The dust barriers being established by annular streams of high velocity air, are not subject to wear or deterioration as would physical seals made of rubber or the like.

It is also pointed out that the annular shoulder 25 on chuck member 21 engageable with the split bushing 22 to limit outward movement of the member, is of a diameter much smaller than that of the chamber 29, thereby preventing, during reciprocation of the chuck, a piston action to take place within the chamber 29 which might affect the swift flow of air through the annular passageways 41 and 44.

While the preferred form of the invention has been shown and described, it will be understood that variation in detail and form may be made without departure from the spirit and scope of the invention as herein claimed.

I claim:

1. In a rock drill front end, a chuck housing, a drill steel chuck member within said housing having one end of a drill steel fitted therein, a first portion of said member spaced from said housing to form therewith a dust chamber, a dust passage through said drill steel opening into said chamber, said chamber adapted to be connected to a suction source for drawing cutting dust through said passage, bearing means for a second portion of said member, an annular passageway around said member axially between said first and second portions opening into sid chamber, and means connecting said passageway to the exterior of said housing whereby upon suction created in said chamber free air is drawn through said passageway to isolate said second portion from the dust within said chamber.

2. In a rock drill front end, a chuck housing, a drill steel chuck member within said housing having one end of a drill steel fitted therein, a first portion of said member spaced from said housing to form therewith a dust chamber, a dust passage through said drill steel opening into said chamber, said chamber adapted to be connected to a suction source for drawing cutting dust through said passage, bearing means for a second portion of said member, a restricted annular passageway around said member axially between said first and second portions opening into said chamber, and means connecting said passageway to the exterior of said housing whereby upon suction created in said chamber free air is drawn through said passageway at high velocity to establish a dust barrier between said chamber and said second portion.

3. In a rock drill front end, a chuck housing, a drill steel chuck member within said housing having one end of a drill steel fitted therein, said member having a portion spaced from said housing to form therewith a dust chamber, a dust passage through said drill steel opening into said chamber, said chamber adapted to be connected to a suction source for drawing cutting dust through said passage, bearing means for said member adjacent said chamber, an annular passageway around said member between said bearing means and chamber, and means connecting said passageway to the exterior of said housing whereby upon suction created in said chamber free air is drawn through said passageway to establish a dust barrier between said bearing means and chamber.

4. In a rock drill front end, a chuck housing, a drill steel chuck member within said housing having one end of a drill steel fitted therein, said member having a portion spaced from said housing to form therewith a dust chamber, a dust passage through said drill steel opening into said chamber, said chamber adapted to be connected to a suction source for drawing cutting dust through said passage, bearing means for said member adjacent opposed ends of said chamber, annular passageways surrounding said member and opening into said chamber through said opposed ends, and means connecting said passageways to the exterior of said housing whereby upon suction created in said chamber free air is drawn through said passageways to isolate said bearing means from the dust within said chamber.

5. In a rock drill front end, a chuck housing, a drill steel chuck member within said housing having one end of a drill steel fitted therein, said member having a portion spaced from said housing to form therewith a dust chamber, a dust passage through said drill steel opening into said chamber, said chamber adapted to be connected to a suction source for drawing cutting dust through said passage, bearing means for said member adjacent said chamber, a groove axially between said bearing means and chamber surrounding said member, a passage leading from said groove to the outside of said housing, and a restricted passageway around said member leading from said groove to said chamber and upon suction created in said chamber enabling free air to be drawn into said chamber to establish a dust barrier between said bearing means and chamber.

6. In a rock drill front end, a chuck housing, a drill steel chuck member within said housing having one end of a drill steel fitted therein, said member having a portion spaced from said housing to form therewith a dust chamber, a dust passage through said drill steel opening into said chamber, said chamber adapted to be connected to a suction source for drawing cutting dust through said passage, bearing elements for said member adjacent opposed ends of said chamber, an annular passageway within each of said bearing elements opening into opposed ends of said chamber, and passage means enabling air from outside of said housing to be drawn into said chamber through said passageways by virtue of the suction within said chamber to establish a dust barrier between said chamber and said bearing elements.

7. The rock drill front end set forth in claim 6, provided with lubricant conveying means for said bearing elements.

References Cited in the file of this patent

UNITED STATES PATENTS

| | | |
|---|---|---|
| 1,545,118 | Bayles | July 7, 1925 |
| 2,684,229 | Bergstrom | July 20, 1954 |
| 2,725,214 | Lofqvist | Nov. 29, 1955 |

FOREIGN PATENTS

| | | |
|---|---|---|
| 101,027 | Sweden | Mar. 11, 1941 |
| 695,009 | Great Britain | July 29, 1953 |
| 1,093,404 | France | Nov. 17, 1954 |